June 26, 1956 R. F. COLTON 2,751,687
PROCESS AND APPARATUS FOR PRODUCING STABILIZED PRODUCTS
Filed May 21, 1952
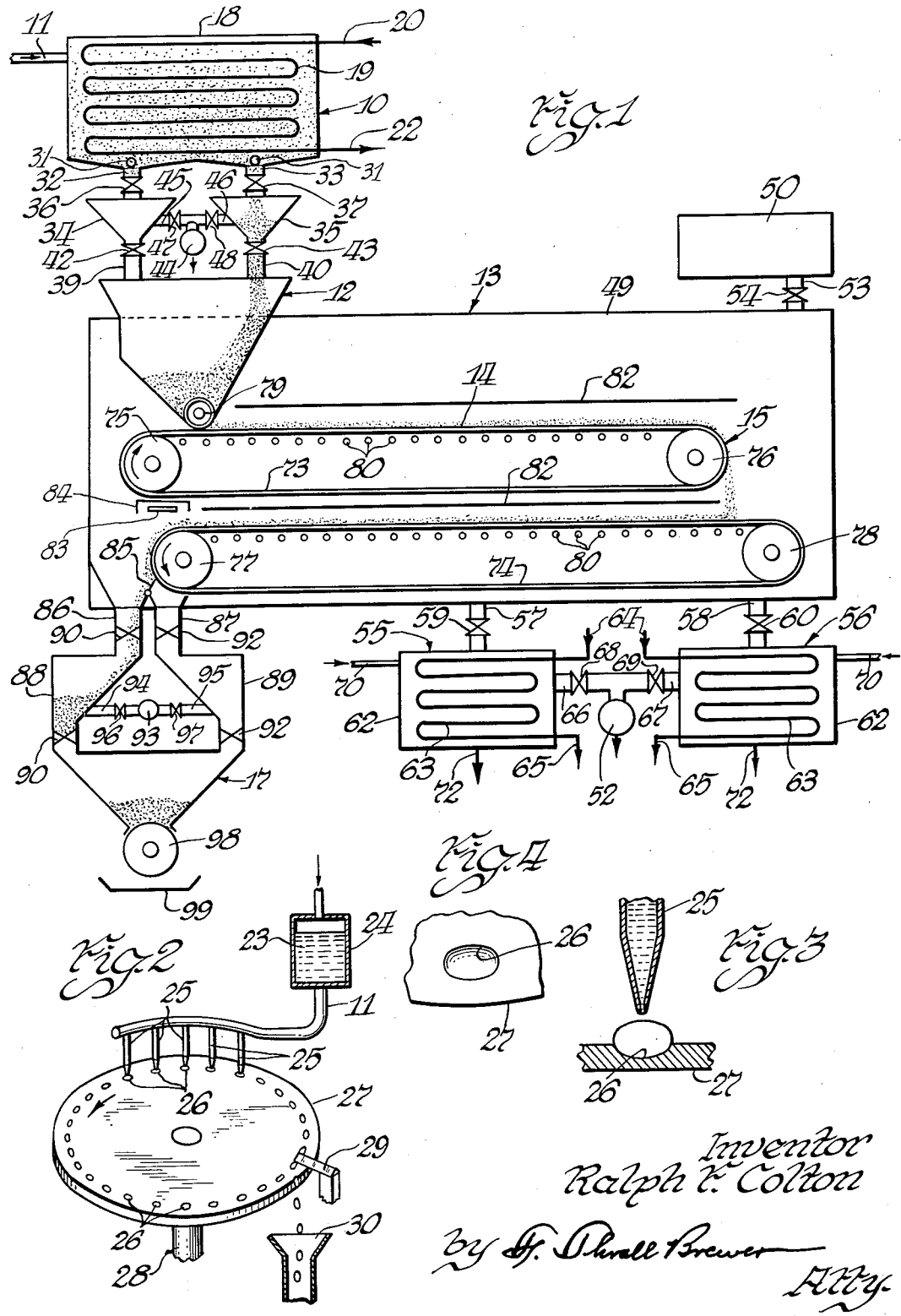
Inventor
Ralph F. Colton

United States Patent Office

2,751,687
Patented June 26, 1956

2,751,687

PROCESS AND APPARATUS FOR PRODUCING STABILIZED PRODUCTS

Ralph F. Colton, Chicago, Ill., assignor to Proctor Drying and Freezing Corporation, Philadelphia, Pa., a corporation of Illinois Application May 21, 1952, Serial No. 289,187

15 Claims. (Cl. 34—5)

This invention relates to a process and the apparatus for producing stabilized products, and more particularly my process and apparatus are adapted to the production of stabilized products in the form of porous desiccated granular particles or pellets.

My process and apparatus, as herein depicted, are well suited to the production, in stable forms, of materials including food stuffs, biological materials, pharmaceuticals and chemical compounds and compositions.

The materials with which this invention is concerned, although having characteristics in common, cover a relatively wide range of classifications when considered by various manners of classification. For example, by one system or manner of classification, the materials include chemical compounds and compositions, biological materials and foods. The chemicals may include such things as photographic chemicals, inks, dye stuffs, metallic particles dispersed with the aid of a dispersing agent, plastics, pharmaceuticals, and colloids such as starches, gums and gelatin. Examples of the biological materials included are serums, vaccines, hormones, and blood and fractions thereof. The foods may be food extracts or foods commonly in liquid form, and more specific examples include milk, beer, or the extract of a fruit, berry, leaf or bark.

Considered from another standpoint, practically all of the products to which my invention relates are prepared from a material which is initially a liquid containing solids in solution or dispersion, including so-called colloidal solutions. Although water and water vapor may be referred to, because water is by far the most common solvent in the materials from which my products are prepared, I do not intend to be limited herein, in any respect to water as the only solvent nor, for example, do I intend to exclude such solvents as water containing organic solvents.

Considered from another standpoint, my invention is concerned with products produced from liquid materials by initially:

(a) Freezing a liquid containing dissolved or dispersed solids; or (b) Effecting extremely rapid or substantially instantaneous freezing of a liquid containing dissolved or dispersed solids; or (c) Effecting extremely rapid or substantially instantaneous freezing of a liquid containing dissolved solids and suspended particles; or (d) Effecting extremely rapid or substantially instantaneous freezing of a liquid containing dissolved solids and dispersed colloids.

With any of the various materials or types of materials to which reference has been made, the term "pellets" is intended to distinguish from particles of powdered material, finely divided granules, flakes and the like. It comprehends and contemplates pieces of substantial size, for example, one thirty-second of an inch to five-eighths of an inch in thickness or diameter, which pieces are of relatively uniform shape and similarly formed. As a matter of fact, by my preferred method of production, the pellets are formed to substantially the desired shape and size by the initial freezing of the liquid material, and thereafter maintain practically that size and shape during the desiccating operation.

In the method and apparatus disclosed herein, I have uniquely developed the concept of initially freezing the material in a manner, and by apparatus such that the resultant frozen material can be utilized to feed freeze-drying apparatus which need not be of batch or shelf type but which is preferably adapted to substantially continuous operation.

Prior to the development of this method and apparatus, difficulty was encountered in providing a relatively heavy but uniform layer of material to be subjected to desiccation. Difficulty was found in introducing heat into a heavy layer of material on the surface of a roll or belt so as to achieve a relatively uniform flow of heat into the partially dry material without overheating of any portions of the material. There has been difficulty in drying materials to a low moisture content when such materials are sprayed into freeze-drying apparatus, because: (a) There is a considerable loss of material deposited on the walls of the enclosure of freeze-drying apparatus and in places where the material cannot be effectively dried and removed for use; and (b) there is a loss of important volatile aromatics from some liquids, which volatile aromatics pass off with the water vapor as the liquid is being sprayed, and cools itself by evaporation to a temperature in equilibrium at the low pressure. With my disclosed method and apparatus, the freezing is accomplished at normal pressures.

It is known that a considerable amount of work has been done with a view toward the development of methods and equipment adapted to stabilization of materials including foods, so that they can be stored for considerable periods and shipped conveniently. One such developed method is that of desiccating the material, but that has been found to be insufficient for stabilization of some of the more complex materials, such as fruits, and is inapplicable to other materials because of its destruction of desirable characteristics, such as flavor or form. Another method under development is that of subjecting the material to electrical impulses or sonic shock, or, in less violent form, to radiation emitted by materials undergoing autonomous nuclear rearrangement.

In the stabilization of fruits, desiccation may be used when applicable, but in its application to oranges, for example, and certain other fruits, desiccation does not produce a stable product. Furthermore, many fruits, including oranges, are too irregular in shape and too low in value to provide an economic and commercially practical application of irradiation technique. Fruit juices eliminate the problems arising from irregular shape and effect a reduction of the bulk, but the effectiveness of the radiation is impeded by the relatively large ratio of water to solids in the juices. The desirable food values are contained in those solids, which represent a small fraction of the weight and bulk of the whole fruit. For example, the solids in the juice of an orange constitute only about one-twentieth ($\frac{1}{20}$) of the weight of the orange.

Ineffectiveness of desiccation alone or of irradiation or sonic shock alone to produce stabilized products in many instances is overcome by my invention, wherein a particular method of desiccation, freeze-drying, and a specific form of product are requisite and antecedent to the final step of passivation.

My invention, having as its objective the production of stabilized food products and the like, further has within its purview the provision of a process and apparatus by which a wide variety of such stabilized products not previously obtainable at desirable standards of acceptability can be produced.

As another object, my invention comprehends the provision of a process and apparatus by which stabilized products and the like can be produced in a continuing sequence of steps, as distinguished from batch treatment.

Another object of this invention is to provide a continuously operable method and apparatus of freeze-drying materials, by the use of which the loss of desirable aromatics of the material is minimized.

My invention has for another object the provision of a method and apparatus wherein freeze-dried material may be sterilized by being subjected to treatment utilizing energy originating from nuclear rearrangement.

I have also provided as a step adapted to use in my method, and with my apparatus, the superficial surface thawing and uniform refreezing of frozen particles, so as to effect the provision of modified surface color for the particles.

It is a further object of this invention to provide a process and apparatus by which stabilized products may be produced so that the resultant product may, if desired, be in the form of particles or pellets of substantially a preselected size and shape.

Another object of my invention is to provide a process and apparatus by which stabilized products may be produced so that the resultant product may, if desired, be in the form of particles or pellets of high porosity and containing the originally dispersed particles in substantially the same relation to dispersing agents as in the original liquid suspension, so that upon reconstitution an emulsion substantially equivalent to the original emulsion is obtained.

My invention has for another object the provision of a process and apparatus adapted to the production and use of particles or pellets of material which are susceptible to being mechanically spread in a relatively uniform layer for drying.

Other objects and advantages of the invention will be apparent from the following description and the accompanying drawings in which similar characters of reference indicate similar parts throughout the several views.

Referring to the single sheet of drawings:

Fig. 1 is a diagrammatic view depicting a preferred form of apparatus forming a part of this invention and by which the method or process of this invention can be carried into effect;

Fig. 2 is a fragmentary diagrammatic view illustrating one specific form of apparatus which may be utilized in one part of the structure diagrammatically illustrated in Fig. 1.

Fig. 3 is a fragmentary sectional view drawn to a larger scale than Fig. 2 and depicting a section taken vertically through a portion of the apparatus shown in Fig. 2; and Fig. 4 is a fragmentary top plan view drawn to a larger scale than Fig. 2 and illustrating a small portion of the apparatus of Fig. 2.

In the exemplary embodiment of my invention which is shown in the accompanying drawings for illustrative purposes, the apparatus, considered generally, includes a refrigerated granulator or "pelletizer" 10 which receives liquid to be treated through a supply conduit 11 and transforms that liquid into frozen pellets. From the granulator 10, the frozen particles pass through refrigerated storage container 12 into an evacuated sublimator 13. In the sublimator, the frozen particles are mechanically spread in an even layer on a surface 14, which surface, in the present instance, constitutes a part of a belt conveyor indicated generally by the reference numeral 15. Desiccation of the frozen particles is effected while they are spread on the surfaces, such as 14, provided within the sublimator. In some instances, and with some materials, such as orange juice, for example, it has been found desirable to passify the desiccated particles by subjecting those particles to radiation for the purpose of enhancing their chemical stability and improving their sterility. This passivation may be accomplished in the sublimator or in apparatus separate from that herein disclosed, and through which the desiccated particles would be passed after being taken from the sublimator. After desiccation, the particles are discharged from the belt conveyor into a discharge hopper 17.

The pellets or particles to which I have referred have definite advantages in both processing and use, as compared to flakes, powdered or fine granular forms of materials, in that they are convenient to handle mechanically and are readily susceptible to being spread by mechanical means in a layer of prescribed thickness which is both effective and efficient for desiccation during processing of the frozen particles. Such pellets flow readily without getting matted or broken. Then after desiccation, the dried pellets are readily susceptible to handling, packing, measurement and reconstitution into liquid form. Moreover, for example, orange pellets do not tend to pack down into a hard mass as does freeze-dried orange juice powder.

Having more detailed reference to the disclosed apparatus, the granulator 10 includes a heat insulating housing 18 within which there is an evaporator unit 19 of a refrigerating system, which evaporator unit is supplied with refrigerant through suitable supply and discharge conduits 20 and 22 respectively. The interior of the granulator is kept at a temperature well below the freezing point of the liquid being treated, and the prepared liquid which is to undergo the treatment for stabilization is supplied to the granulator through the supply conduit 11. Also within the granulator there is an apparatus for dividing the liquid supplied thereto into drops, so that the liquid is frozen in pellet form. In some instances, the particles may desirably be small, while in other instances the particles may be larger and may even be molded into predetermined shapes to enhance their utility, appearance or appeal for different uses or applications.

One method of forming particles is to inject the material to be frozen, through an orifice of small diameter, into a container of refrigerated liquid, such as a liquefied refrigerant, wherein the liquid drops separate and freeze under ideal conditions of heat interchange.

In Figs. 2, 3 and 4, I have diagrammatically indicated one form of apparatus which may be utilized within a granulator for producing particles or pellets of substantially a predetermined size and shape. In this disclosed apparatus, a supply of prepared liquid 23 such, for example, as coffee extract, is carried in a supply reservoir 24 and flows from that reservoir through the supply conduit 11 to dispensing nozzles, such as a series of pipettes 25; the pipettes being spaced to coincide with the spacing of a series of recesses 26 in the surface of a plate 27. The surface of the plate and the surfaces of the respective recesses are desirably smooth. Also, the plate 27 may be made of metal having a surface, such as chrome plating, which is non-corrosive and non-adhesive with the material being treated.

Although the plate 27 might take other forms, such as being cylindrical with series of recesses 26 preferably distributed thereon, the plate herein disclosed has a substantially flat top surface and is supported for rotation in successive steps by a shaft 28. At each step of its rotational movement in the direction indicated by an arrow, the plate advances an amount such that the pipettes 25 are aligned with successive groups of recesses 26. Each time a group of recesses becomes aligned with the pipettes, a predetermined quantity of the liquid is released from each of the pipettes to fill the recesses aligned therewith, and preferably to provide a meniscus of predetermined size projecting above the surface of the plate. Since the plate is chilled, and because the atmosphere within the granulator is well below the freezing point of the liquid being treated, the particles are frozen to a solid state while they are carried in the recesses. A brush or scraper element 29 is utilized to remove the frozen particles from their respective recesses and to cause them to fall into a discharge conduit 30, as depicted in Fig. 2, or to fall to the bottom of the granulator. In utilizing the apparatus depicted in Fig. 2 as a part of the granulator 10 of Fig. 1, the plate 27 is enclosed within the housing 18, and the pipettes 25 extend through the top wall of that housing, rather than having the conduit 11 extending through the end wall of the housing; the pipettes and plate being in the relationship depicted in Fig. 2 and the scraper element 29 being secured to an internal support within the housing 18, so that the pellets from the plate fall to the bottom of the housing to flow to and through the remaining apparatus as depicted in Fig. 1.

The freezing of the liquid in the recesses of the plate 27 to form pellets is desirably effected at a substantially uniform rate in order to avoid the tendency of the dried pellets to crack. Thus, since the mold plate transfers heat more rapidly than air, it is desirable to use the mold cavities for successive drops of liquid at a rate which prevents the plate from becoming excessively chilled at the mold cavities, unless splitting of the dried pellets is a desirable feature.

Freezing of particles or pellets at a very rapid rate has a tendency to alter the natural color of some materials. If the natural color of the particles is desirable, and the initial freezing has altered that color, the alteration may be corrected by reforming the surface by thawing and immediate refreezing without affecting the normal shape of the particles, and without actually liquefying the particles to any appreciable depth. This is desirably accomplished in the disclosed apparatus by exposing the particles for a short period to the action of heat or infrared radiation heating elements or infra-red lamps 31 located at the outlets of the granulator, as shown in Fig. 1, to effect the superficial thawing, and thereafter refreezing the particle surfaces is effected by exposure to the chilled atmosphere in the collecting hoppers 34 and 35.

Some of the materials which are susceptible to preparation and use in dried pellet form, in accordance with this invention, have aromatic qualites which should be retained so as to be present in the reconstituted product. I have effected the preservation of very large percentages of the aromatic qualities of my products by the freezing of the original liquid material into pellet form, at atmospheric pressure, and then desiccating the pellets in a sublimator operating at relatively low pressure.

What may be termed "substantially instantaneous freezing" has been used in the past with biological materials for the creation of ice crystals wherein the cell walls of the organisms were not ruptured, and also to prevent changes in the concentration and acidity of the culture medium due to separating out of ice crystals, as would occur during relatively slow freezing. Rapid freezing has also been used in the preservation of vegetables, in which instance, again, the purpose was to produce small ice crystals. To my knowledge, however, extremely rapid or substantially instantaneous freezing has not before been utilized in the production of products in pellet form prior to freeze-drying and for the accomplishment of the purposes herein set forth.

In the freezing of materials in pellet form, terms such as "extremely rapid" or "substantially instantaneous," as applied to such freezing, must necessarily be somewhat relative in respect to the applications to pellets of different sizes and of different materials. In any instance, the exterior of a particle or pellet freezes to form an exterior shell before the interior portion freezes. Thus, it is practically impossible to establish a maximum permissible time within which the interior of a pellet must be frozen. The rate of freezing, with materials involving colloids, dispersing agents or constituents forming low-freezing-point entities, should be sufficiently rapid to cause the exterior portions of the entities to freeze within seconds after coming in contact with the cold surface, fluid or gas stream used for withdrawing the heat therefrom.

In some instances, the rate of "extremely rapid" or "substantially instantaneous" freezing is established by the end result. For example, with colloidal materials, such as milk, the rate of freezing of pellets should be too rapid to provide time necessary for agglomeration of colloidally dispersed particles.

When frozen as disclosed herein and desiccated while frozen, the resultant pellets not only maintain their size and shape, but also acquire a porous structure and are readily soluble for reconstitution.

Referring again to the apparatus of Fig. 1, the granulator 10 is connected through outlet conduits 32 and 33 to collecting hoppers 34 and 35 respectively; the outlet conduits 32 and 33 being provided with air lock valves. The collecting hoppers 34 and 35 are in turn connected to a refrigerated storage container 12 through conduits 39 and 40 respectively, which latter conduits are provided with air lock valves 42 and 43. The collecting hoppers 34 and 35 are also connected to a vacuum pump 44 through conduits 45 and 46, respectively, which conduits are also equipped with air lock valves 47 and 48. With this arrangement of parts, one collecting hopper is utilized at a time for receiving the frozen particles from the granulator. The air lock valves associated with the collecting hoppers are alternately opened and closed, so that one is receiving particles from the granulator while the other is discharging particles into the refrigerated storage container 12. Each collecting hopper is evacuated by the vacuum pump 44 prior to the discharge of particles therefrom into the refrigerated storage housing. Thus, the particles are transferred to a refrigerated storage housing which is maintained at a very low pressure, without carrying with them an appreciable amount of air or vapor of any volatile liquid freezing vehicle used in the granulator.

The sublimator 13, with which the refrigerated storage container 12 communicates, has a sealed housing connected for evacuation to vacuum pumps 50 and 52, both of which pumps are utilized to effect the initial evacuation when the apparatus is put into use after a period of non-use. The vacuum pump 50 is connected to the sublimator housing 49 through a conduit 53 which is equipped with an air lock valve 54; this pump being shut off by a vacuum valve after the initial evacuation of the sublimator housing is accomplished and some predetermined low pressure value is reached. The vacuum pump 52 is connected to the sublimator housing 49 through condenser units 55 and 56, which condenser units are alternately used for removing moisture given off by the particles being treated within the sublimator housing during the desiccation process. It is desirable, during the desiccation process, to maintain the pressure within the sublimator at a value below 4 mm. of mercury. Being alternately used, the condenser units are subject to periodic defrosting when not in use.

As disclosed, the condenser units 55 and 56 are connected to the sublimator housing 49 through conduits 57 and 58 respectively, which conduits are equipped with air lock valves 59 and 60. The evaporators 55 and 56 each have a heat insulating housing 62 which encloses an evaporator unit 63 of a refrigerating system and which is supplied with refrigerant through inlet and outlet conduits 64 and 65 respectively. The housings 62 of the condenser units are connected to the vacuum pump 52 through conduits 66 and 67, which are respectively provided with air lock valves 68 and 69, whereby air and moisture are removed from the sublimator by the connection thereof alternately through the condenser units 55 and 56 to the vacuum pump 52. When either of the condenser units is not in use for collecting moisture from the sublimator housing, it is defrosted by forcing steam through the condenser housing from an inlet conduit 70 to an outlet conduit 72.

To provide a surface upon which a uniform layer of frozen particles may be spread within the sublimator, for the removal of the water therefrom, and in order to provide for the continuous and progressive operation of the sublimator, the belt conveyor 15 is utilized and, in the present instance, includes two conveyor belts 73 and 74 arranged and disposed so that the conveyor belt 73 receives frozen particles from the refrigerated storage container 12 and discharges those particles onto one end of the conveyor belt 74. The conveyor belt 73 is carried by rollers 75 and 76, at least one of which is driven. Likewise, the conveyor belt 74 is carried by rollers 77 and 78, at least one of which is driven. With the disclosed arrangement of parts, the particle carrying portions of the conveyor belts move in opposite directions and the conveyor belt 73 is above the conveyor belt 74 and is so disposed relative thereto that the discharge end of the upper conveyor belt 73 is above the receiving end of the belt 74. Also, the refrigerated storage container 12 is located at the receiving end of the conveyor belt 73, so that the particles travel almost the full length of that conveyor belt before being discharged onto the conveyor belt 74 for movement in the opposite direction. A distributing roller 79 at the bottom of the refrigerated storage container 12 spreads the particles evenly and uniformly over the surface of the conveyor belt 73 as that belt moves along.

Each of the conveyor belts 73 and 74 is made of a material and in a manner such that the particles carried thereby will be subjected to the action of radiation within a range of from 2 to 9 microns (20,000 to 90,000 A.). If the particles are relatively large, the belt material may take the form of an open-work screen or mesh having openings for the passage of the radiated rays, but small enough to retain the particles. If the particles are extremely small, the belt may be made of a foraminous structure in which the mesh openings are filled with plastic material, such as polymerized ethylene-type molecules, of which tetrafluoroethylene polymer $(C_2F_4)_x$, trifluoromonochlorethylene polymer $(C_2ClF_3)_x$, or polyethylene $(C_2H_4)_x$, are examples, which material transmits a high percentage of the desired radiation.

In the disclosed embodiment of my invention, radiation within the desired range is provided by a series of wires 80, the wires being in parallel relationship and either above, below or both above and below the surface of each of the particle carrying belt surfaces. The wires are of a selected material and are connected to a suitable current source and thereby heated to an extent to effect the emission of rays within the desired range. Facing each of the conveyor belts 73 and 74 at the portions thereof which have the heating wires 80 associated therewith is a reflector 82, which reflects the rays back to the exposed upper surfaces of the particles which are being desiccated.

In some instances, the desiccation effected by the exposure of the frozen particles to the action of radiation within a range suitable for effecting desiccation, may be sufficient for producing a stable finished product. However, some materials, such as orange juice, are made more stable for long periods of storage by subjecting the desiccated particles to the action of beta or other rays generated by nuclear rearrangement or by electro-mechanical means such as high voltage generators capable of generating voltage from 2,000,000 to 10,000,000 volts, which devices are commonly known in connection with the preservation of food. They have been found to leave no radio-activity in the products thus treated. As previously explained, the step of subjecting the desiccated particles to the action of beta rays is preferably accomplished externally of the sublimator, and after the particles have been discharged therefrom. The action of the beta rays upon the desiccated particles is typical of that referred to as passivation. In the disclosed apparatus, the passivation, when desired, is effected by a shielded plate 83 containing radio active material, such as strontium, phosphorus or cadmium, or like materials capable of emitting gamma or beta rays; or by an electronic tube or battery of tubes at the position of the plate 83. A metallic shield is shown at 84. It may be readily understood that similar apparatus is easily applicable for use external to the sublimator.

Since this invention is concerned with the stability of the finished product, and such stability is attainable by reducing the reactivity—both chemical and biological, maximum stability can be achieved in the presence of enzymes and micro-organisms only by deactivating or "passifying" such organisms and enzymes whose natural function results in conversion of the original product into a less acceptable condition. Evidence of such activity is destruction of aromatic constituents, production of undesirable new constituents, such as those causing rancidity, and reaction with constituents of particular interest, such as vitamins.

Thus, by the terms "passify" or "passivation," as used in this application, it is meant that the product is made less reactive due to partial or complete sterilization of micro-organisms whose metabolism is supported by the product; and/or the denaturization of enzymes previously capable of accelerating dilatory actions between constituents of the product.

At the discharge end of the conveyor belt 74, a shiftable trap 85 is provided for deflecting the discharged particles into one or the other of two conduits 86 and 87, which conduits communicate with collecting hoppers 88 and 89, through air lock valves 90 and 92. The collecting hoppers 88 and 89 are each adapted to discharge into the discharge hopper or classifier 17 through air lock valves 90 and 92. Thus, as in previous instances, the collecting hoppers 88 and 89 are used alternately, and one is open to the sublimator and evacuated, while the other is sealed off from the sublimator and opened with respect to the discharge hopper. A vacuum pump 93 is connected to the collecting hoppers 88 and 89 through conduits 94 and 95 respectively, and air lock valves 96 and 97, whereby the discharge hoppers may be selectively evacuated. In the disclosed apparatus, a discharge cylinder 98 is mounted for rotation at the lower end of the discharge hopper and may comprise either a crusher for crushing the granules of desiccated material as they leave that hopper, or may serve as a classifier for selecting the particles in accordance with size. A pan 99 below the discharge cylinder provides an illustrative representation of a collector for the desiccated granules of stabilized material which are discharged from the sublimator.

Giving more detailed consideration to the characteristics of milk products and the like when prepared as herein set forth, it is particularly notable that my products in pellet form are readily soluble, even in cold water, for reconstitution into a resultant solution which has natural flavor.

When milk is dried, as heretofore done, in the presence of air, such as by spray drying or drum drying at atmospheric pressure or at substantially less than atmospheric pressure, the effect of the heat and air is to cause the dried milk particles to have an off-flavor, sometimes referred to as a slightly carmelized flavor. To overcome that difficulty, milk has been freeze-dried in the customary manner and with the result that the product has good flavor, but is not readily soluble in water without being subjected to mechanical action to produce extremely fine particles.

I have found, however, that pellets of milk or milk products, made as herein described, including the step of substantially instantaneous freezing of the liquid, and of sizes from one-sixteenth inch to one-fourth inch in diameter are readily soluble.

As specifically applied to products, by way of examples, as, for instance, coffee, a solution in water of a soluble coffee extract is made which has a solids concentration by weight within the range of 18 to 55 percent. This liquid extract is formed into frozen "beans" or pellets in the manner disclosed and described, as by the use of the apparatus depicted in Figs. 2, 3 and 4. The frozen "beans" or pellets thus produced are then desiccated in a sublimator such as that shown and described, wherein they are subjected to a vacuum of less than 4 mm. of mercury while retained in their frozen state, and are heated by heating elements which may emit heat rays of 2 to 9 microns (20,000 to 90,000 A.). The desiccation is effected without melting the frozen volatile liquid. The resulting product is an integral dry porous body of substantially unchanged shape, and constitutes a soluble "bean" or pellet of coffee extract.

Other specific products are handled in practically the same manner, except that concentrates or extracts are not required for many products. As another example, skim milk is frozen in its normal or concentrated state, and in such states contains from 9 to 35 percent by weight of solids. Likewise, orange juice may be frozen in its natural state, or with some concentrate added, and in such instances, contains from 11 to 35 percent by weight of solids.

From the foregoing description and reference to the accompanying drawings, it may be readily understood that I have provided apparatus for producing stabilized food products and the like from prepared material in liquid form. The apparatus is suited to substantially continuous operation and performs a series of successive steps as the material progresses therethrough.

The process which I have developed and illustrated is initiated by the transformation of prepared liquid material into frozen pellets or particles which may, if desired, be individually molded to a preselected size and shape. If required, the particles may be further treated by superficially thawing the surfaces of the particles and refreezing those superficially thawed particles. The frozen particles are temporarily stored in a refrigerated storage container which is evacuated, and from that container the particles are spread in a uniform layer on a flat surface for desiccation by the action of heat energy, which may be in the nature of infra-red rays, while being in a rarefied atmosphere from which the moisture is continually removed. For convenience, the flat surface upon which the particles are spread may comprise a belt conveyor. When required by the nature and the characteristics of the material which is being stabilized, the additional step of passifying the desiccated particles may be utilized. The passification is accomplished by exposing the desiccated particles to beta or gamma rays or shortwave-length radiation; this may be done as an entirely separate operation.

Although my invention has been described in connection with specific details of the embodiments thereof, it must be understood that it is not intended to be limited thereto except in so far as set forth in the accompanying claims.

Having thus described my invention, what I claim as new and desire to secure by Letters Patent of the United States is:

1. The process of producing stabilized products of the type described from raw or prepared materials in a normal liquid state, such process comprising the steps of molding the liquid into the form of a pellet of substantially predetermined size by heat transfer from the liquid to another material by first dropping a predetermined quantity of the liquid into a cavity of predetermined size on the surface of the other material to form a globule, freezing the globule in the cavity to form a pellet and then removing the frozen pellet from the cavity, thereafter feeding the frozen pellet onto a conveyor in a manner to form a relatively uniform layer thereon, desiccating the pellet in substantially the formed size while maintaining the frozen state thereof in a rarefied atmosphere, and collecting the desiccated pellet from the conveyor.

2. The process of producing stabilized products as defined in claim 1, and wherein the step of freezing is characterized by the melting and refreezing of only the surface layers of the pellet before feeding the pellet onto the conveyor and subjecting the pellet to desiccating action in a rarefied atmosphere in order to remove any undesired discoloration which appeared when the globule was frozen to form the pellet.

3. The process of producing stabilized products of the type described from raw or prepared materials in a normal liquid state, such process comprising the steps of molding the liquid into pellets of uniform size by first dropping a predetermined quantity of the liquid into each of a series of cavities of predetermined size to form globules therein, freezing the globules in the cavities to form the pellets and then removing the frozen pellets from the cavities, thereafter distributing and spreading the frozen pellets in a relatively even layer on a surface, and desiccating the frozen pellets in substantially the formed size by the application of heat thereto under a vacuum in an amount which is limited so as to maintain the frozen state thereof until the ice is sublimed.

4. The process of producing stabilized products from raw or prepared colloidal materials including dispersed particles by the steps defined in claim 3, and wherein the freezing is effected by contact of the globules with the surfaces of the cavities with such cavity surfaces having a sufficiently high rate of heat transfer to minimize agglomeration of the dispersed particles in the globules during the freezing thereof, whereby the stabilized product is readily dispersible for reconstitution.

5. The process of producing stabilized products of the type described from materials in a normal liquid state, which process comprises the steps of molding the liquid into a discrete unit of a characteristic shape by first dropping a predetermined quantity of the liquid into a cavity having the desired characteristic shape to form a globule of the liquid, freezing the globule in the cavity to form the unit and then removing the frozen unit from the cavity, and thereafter desiccating the unit while in the frozen state in a rarefied atmosphere while maintaining the characteristic shape.

6. The process of producing a stabilized coffee product from liquid coffee extract by the steps defined in claim 5, and wherein the discrete unit is molded into a shape resembling a naturally occurring coffee bean.

7. The process as defined in claim 5, and further characterized by the steps of thawing only the surface layer of the frozen unit and refreezing the thawed surface layer of the unit before desiccation in order to remove any undesired discoloration which appeared when the globule was frozen to form the unit.

8. In an apparatus adapted for continuous operation to produce stabilized products from materials in a liquid state, said apparatus including, in combination, a granulator having a refrigeration means and a molding means for dividing a liquid into globules and freezing the globules into pellets, said molding means comprising a surface having a series of cavities of predetermined shape therein, means for dropping a predetermined quantity of a liquid into each cavity wherein the globules are frozen into the pellets by the refrigeration means, and means for removing the frozen pellets from the cavities, a refrigerated storage container for receiving the frozen particles, a sublimator including a housing, said refrigerated storage container being in communication with the housing so as to be evacuated thereby, a conveyor means in said housing for receiving frozen particles from the refrigerated storage container, means for evacuating the housing, heating elements in the housing adjacent the conveyor means for subjecting the frozen pellets to desiccating action as the pellets move therethrough, means for removing vaporized liquid and infiltrated air from the housing, and a collecting chamber being connected to the housing for the collection of the desiccated pellets.

9. In an apparatus adapted for continuous operation to produce stabilized products from materials in a liquid state, said apparatus including, in combination, a granulator having a refrigeration means and a molding means for dividing a liquid into globules and freezing the globules into pellets, said molding means comprising a surface having a series of cavities of predetermined shape therein, means for dropping a predetermined quantity of a liquid into each cavity wherein each globule is frozen into a pellet by the refrigeration means, and means for removing the frozen pellets from each cavity, a refrigerated storage container for receiving the frozen pellets, a sublimator including a housing, said storage container being in communication with the housing so as to be evacuated thereby, a conveyor means in said housing for receiving the frozen pellets from the refrigerated storage container, means for evacuating the housing and refrigerated storage container, heating elements in the housing adjacent the conveyor means for subjecting the frozen pellets to desiccating action as the pellets move therethrough, means for removing vaporized liquid and infiltrated air from the housing, and a collecting chamber in communication with the housing for the collection of the desiccated pellets.

10. An apparatus for producing stabilized products from materials in a liquid state, said apparatus including, in combination, a granulator having a refrigeration means and a molding means for dividing a liquid into globules and freezing the globules into pellets, said molding means comprising a surface having a series of cavities of predetermined shape therein, means for dropping a predetermined quantity of the liquid into each cavity wherein each globule is frozen into a pellet by said refrigeration means and means for removing the frozen pellet from each cavity, a storage container connected to the granulator to receive said frozen pellets therefrom, a sublimator including a housing in communication with the storage container for receiving the frozen pellets therefrom, said housing having therein a surface for receiving a layer of said frozen pellets and heating means for subjecting the layer of frozen pellets to desiccating action, means for removing vaporized liquid from the housing, means for evacuating the housing, and a collecting chamber for receiving the desiccated pellets from said surface.

11. The process which comprises forming separate entities of aqueous liquid containing solids in unstable dispersion, molding said entities, as such, into solid form by first dropping a predetermined quantity of the liquid into a cavity of predetermined size to form a globule, freezing the globule in the cavity to form a separate entity, removing the frozen entity from the cavity, and thereafter desiccating said frozen entity under vacuum by sublimation, whereby to form an integral dry body of substantially the shape of the frozen entity, said body being porous and characterized by ready dispersibility into a like aqueous medium.

12. The process of producing stabilized products of the type described from materials in a normal liquid state, which process comprises the steps of freezing the liquid by heat transfer to another material into the form of pellets of substantially uniform size by first dropping a predetermined quantity of the liquid into each of a series of cavities of predetermined size on the surface of the other material to form globules, freezing the globules in the cavities to form the pellets and then removing the frozen pellets from the cavities, and thereafter feeding the pellets in their frozen state onto a conveyor in a manner to form a relatively uniform layer thereon, desiccating the pellets while maintaining the frozen state in a rarefied atmosphere, and collecting the desiccated pellets from the conveyor means.

13. In an apparatus adapted for continuous operation to produce stabilized products from materials in a liquid state, said apparatus including, in combination, a granulator having a refrigeration means and a molding means for dividing a liquid into globules and freezing the globules into pellets, said molding means comprising a surface having a series of cavities of predetermined shape therein, means for dropping a predetermined quantity of a liquid into each cavity wherein the globules are frozen into the pellets by the refrigeration means, and means for removing the frozen pellets from the cavities, a sublimator including a housing for receiving the frozen pellets, means for evacuating the housing, means in the housing for desiccating the frozen pellets, and means for collecting the desiccated pellets.

14. The structure defined in claim 13 together with means for effecting relative movement between the surface and the means for dropping a predetermined amount of a liquid.

15. The structure defined in claim 13 together with means for thawing only the surface layers of the frozen pellets and refreezing the thawed surface layers of the pellets before the desiccation thereof in order to remove any undesired discoloration which appeared when the globules were frozen into the pellets.

References Cited in the file of this patent

UNITED STATES PATENTS

| | | |
|---|---|---|
| 888,257 | Passburg | May 19, 1908 |
| 1,465,020 | Monti | Aug. 14, 1923 |
| 1,630,985 | Tival | May 31, 1927 |
| 1,744,884 | Greiner | Jan. 28, 1930 |
| 1,937,174 | Taylor | Nov. 28, 1933 |
| 1,981,583 | Craig | Nov. 20, 1934 |
| 2,388,917 | Hormel | Nov. 13, 1945 |
| 2,390,167 | Patrick, et al. | Dec. 4, 1945 |
| 2,411,152 | Folsom | Nov. 19, 1946 |
| 2,446,075 | Blair | July 27, 1948 |
| 2,467,318 | Kellogg | Apr. 12, 1949 |
| 2,491,837 | Smith-Johannsen et al. | Dec. 20, 1949 |
| 2,515,098 | Smith | July 11, 1950 |
| 2,523,552 | Birdseye | Sept. 26, 1950 |
| 2,528,476 | Roos et al. | Oct. 31, 1950 |
| 2,533,125 | Levinson et al. | Dec. 5, 1950 |

FOREIGN PATENTS

| | | |
|---|---|---|
| 883,178 | France | Mar. 15, 1943 |